(12) United States Patent
Bohle

(10) Patent No.: US 8,950,833 B2
(45) Date of Patent: Feb. 10, 2015

(54) FURNITURE PART COMPRISING A TORQUE-TRANSMITTING SHAFT

(71) Applicant: Julius Blum GmbH, Hochst (AT)

(72) Inventor: Wolfgang Bohle, Gotzis (AT)

(73) Assignee: Julius Blum GmbH, Hochst (AT)

( * ) Notice: Subject to any disclaimer, the term of this patent is extended or adjusted under 35 U.S.C. 154(b) by 0 days.

(21) Appl. No.: 13/951,879

(22) Filed: Jul. 26, 2013

(65) Prior Publication Data

US 2013/0307390 A1 Nov. 21, 2013

Related U.S. Application Data

(63) Continuation of application No. PCT/AT2012/000007, filed on Jan. 12, 2012.

(30) Foreign Application Priority Data

| Jan. 28, 2011 | (AT) | ................................. A 124/2011 |
| May 20, 2011 | (AT) | ................................. A 729/2011 |

(51) Int. Cl.
| A47B 95/00 | (2006.01) |
| A47B 88/00 | (2006.01) |
| F16C 3/02 | (2006.01) |
(Continued)

(52) U.S. Cl.
CPC . *F16C 3/02* (2013.01); *A47B 88/04* (2013.01); *E05D 15/463* (2013.01); *A47B 2210/0078* (2013.01); *E05Y 2201/62* (2013.01); *E05Y 2900/20* (2013.01); *E05Y 2201/706* (2013.01)
USPC .......................................... 312/331; 312/323

(58) Field of Classification Search
USPC ........ 312/331, 334.6, 323, 402; 403/315, 316
See application file for complete search history.

(56) References Cited

U.S. PATENT DOCUMENTS

| 1,535,739 A | * | 4/1925 | Santos ........................... 403/316 |
| 2,305,234 A | * | 12/1942 | Bratz ............................. 24/581.1 |
| 5,076,652 A | | 12/1991 | Lautenschlager |

(Continued)

FOREIGN PATENT DOCUMENTS

| AT | 410 162 | 3/1999 |
| AT | 502 937 | 6/2007 |

(Continued)

OTHER PUBLICATIONS

International Search Report (ISR) issued May 24, 2012 in International (PCT) Application No. PCT/AT2012/000007.

(Continued)

*Primary Examiner* — Janet M Wilkens
*Assistant Examiner* — Andrew Roersma
(74) *Attorney, Agent, or Firm* — Wenderoth, Lind & Ponack, L.L.P.

(57) ABSTRACT

A movably mounted furniture part includes a torque-transmitting shaft, especially a synchronizing rod. The shaft has at least two sub-shafts, one sub-shaft being a rod-type component and the other sub-shaft being a connecting part. A connecting device connects the rod-type component to the connecting part, and can include at least one spring that resiliently holds the rod-type component and the connecting part together. A locking part is formed on the rod-type component and/or on the connecting part and/or can be mounted thereon, with the locking part securing the rod-type component and the connecting part against detachment.

16 Claims, 14 Drawing Sheets

(51) Int. Cl.
*A47B 88/04* (2006.01)
*E05D 15/46* (2006.01)

(56) References Cited

U.S. PATENT DOCUMENTS

| | | | | |
|---|---|---|---|---|
| 5,582,489 | A * | 12/1996 | Marzio et al. | 403/354 |
| 5,951,063 | A * | 9/1999 | Szabo | 285/303 |
| 6,698,258 | B2 * | 3/2004 | Westwinkel | 70/85 |
| 6,869,110 | B2 * | 3/2005 | Okada et al. | 285/319 |
| 6,913,156 | B1 | 7/2005 | Wolff | |
| 7,014,220 | B2 * | 3/2006 | Szabo et al. | 285/305 |
| 7,794,028 | B2 * | 9/2010 | Brunnmayr | 312/323 |
| 8,188,270 | B2 | 5/2012 | Grunenberg et al. | |
| 8,366,215 | B2 | 2/2013 | Chen | |
| 2003/0235596 | A1 | 12/2003 | Gao et al. | |
| 2008/0054771 | A1 | 3/2008 | Brunnmayr | |
| 2009/0261698 | A1 * | 10/2009 | Cabal Velarde et al. | 312/334.8 |
| 2010/0219727 | A1 * | 9/2010 | Aguilar Ante et al. | 312/319.1 |
| 2010/0283365 | A1 * | 11/2010 | Chen | 312/334.4 |
| 2012/0038255 | A1 * | 2/2012 | Netzer et al. | 312/319.1 |
| 2012/0181909 | A1 | 7/2012 | Isele et al. | |

FOREIGN PATENT DOCUMENTS

| | | |
|---|---|---|
| AT | 507 656 | 7/2010 |
| DE | 89 12 349 | 12/1989 |
| DE | 295 07 322 | 7/1995 |
| EP | 1036526 A1 * | 9/2000 |
| EP | 1 875 026 | 4/2006 |
| EP | 2 248 442 | 11/2010 |
| WO | WO 2007007950 A1 * | 1/2007 |
| WO | WO 2009114885 A1 * | 9/2009 |
| WO | WO 2010129971 A1 * | 11/2010 |
| WO | 2011/047396 | 4/2011 |
| WO | WO 2011075753 A1 * | 6/2011 |

OTHER PUBLICATIONS

Austrian Patent Office Search Report issued Oct. 19, 2011 in Austrian Patent Application No. A 124/2011 (ASR 124).

Austrian Patent Office Search Report issued Mar. 19, 2012 in Austrian Patent Application No. A 729/2011 (ASR 729).

* cited by examiner

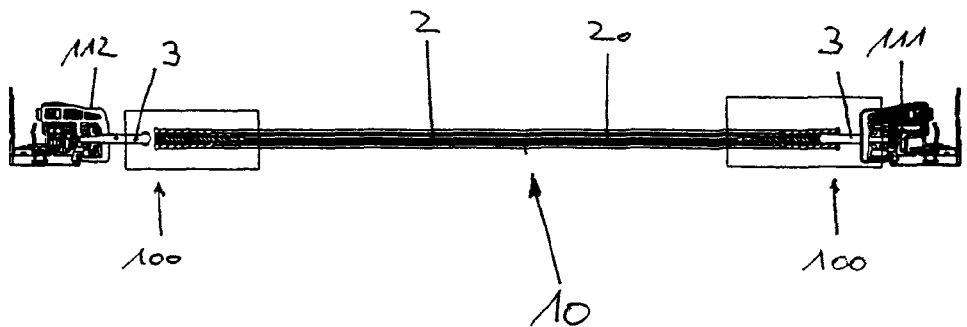
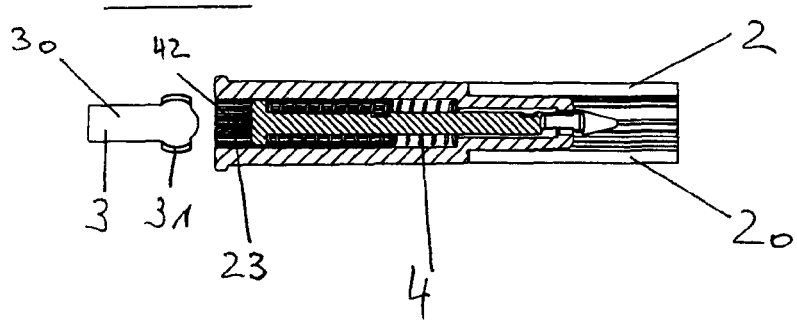
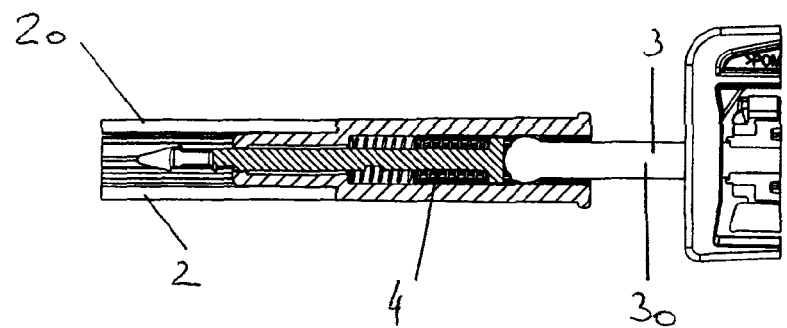

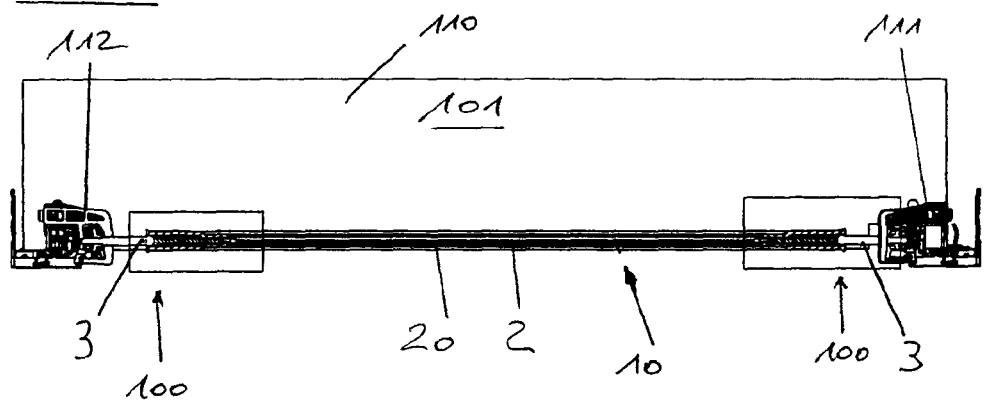
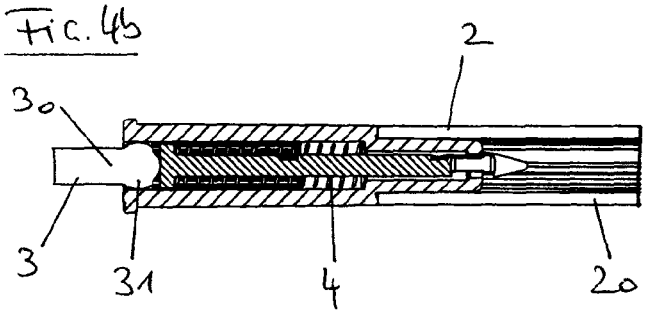
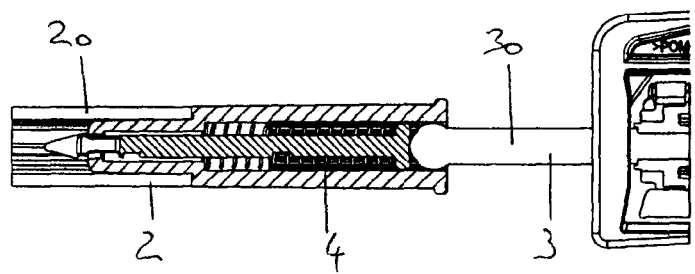

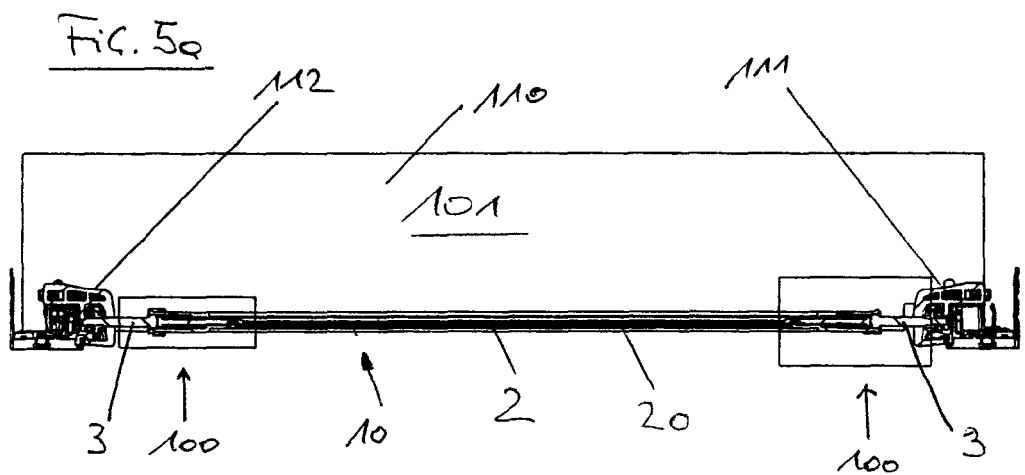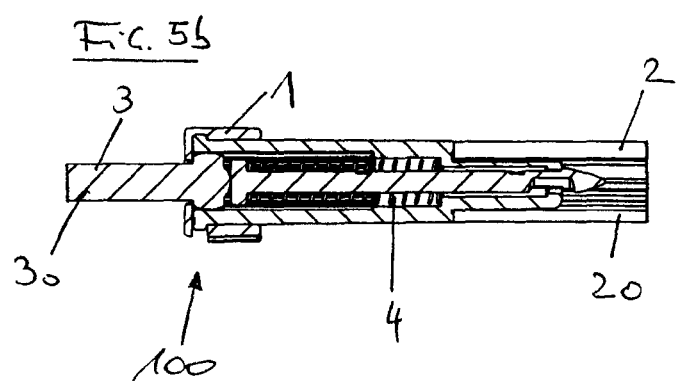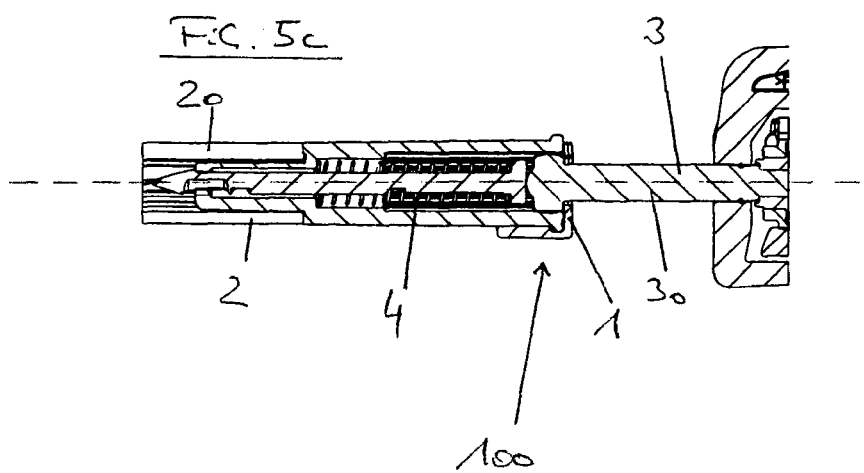

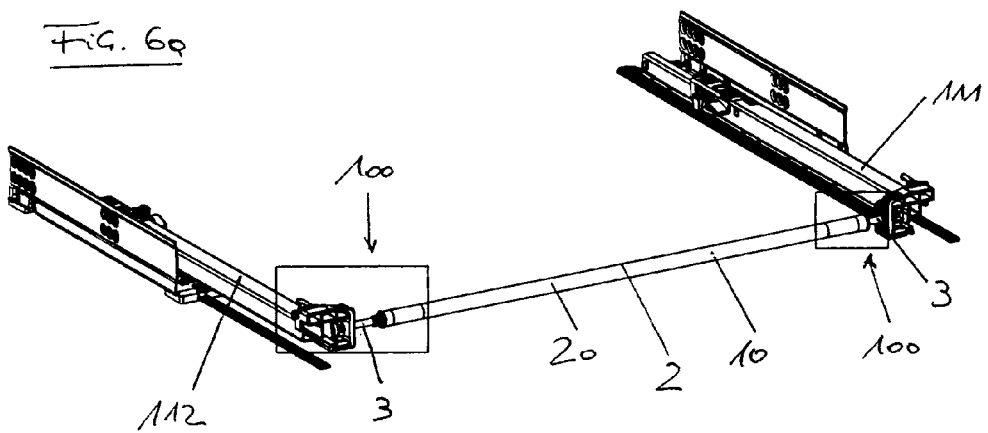
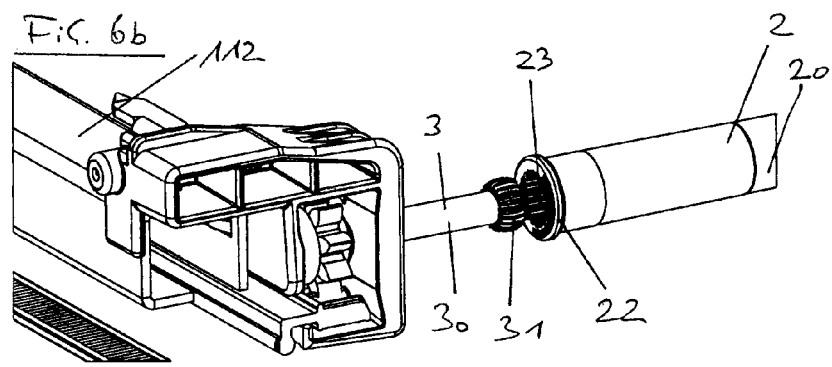
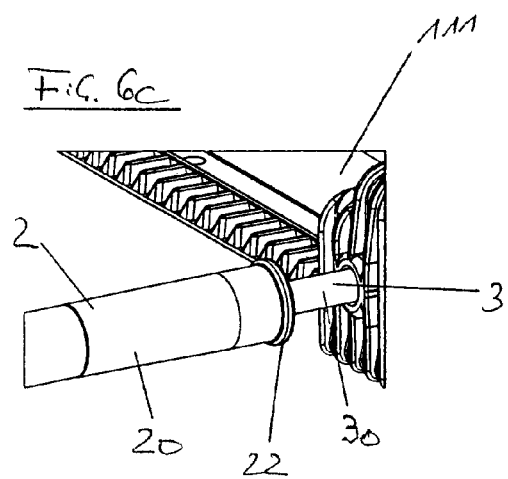

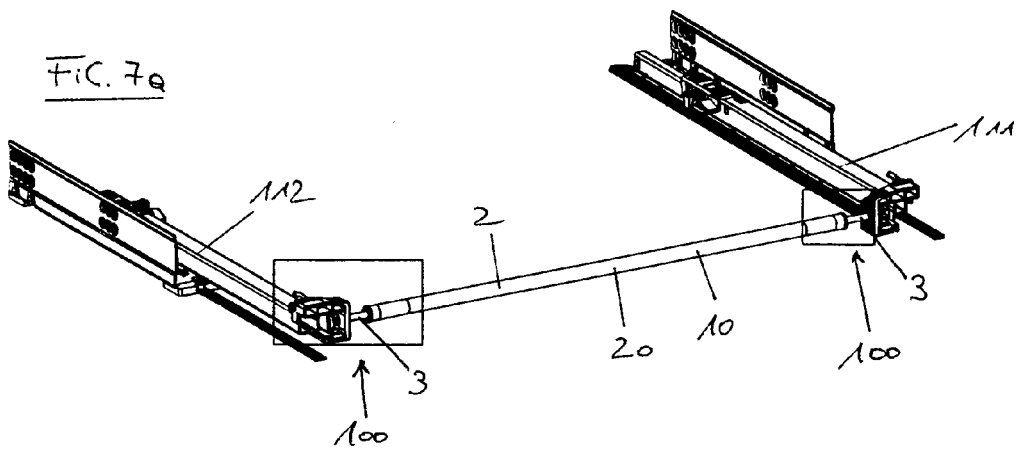
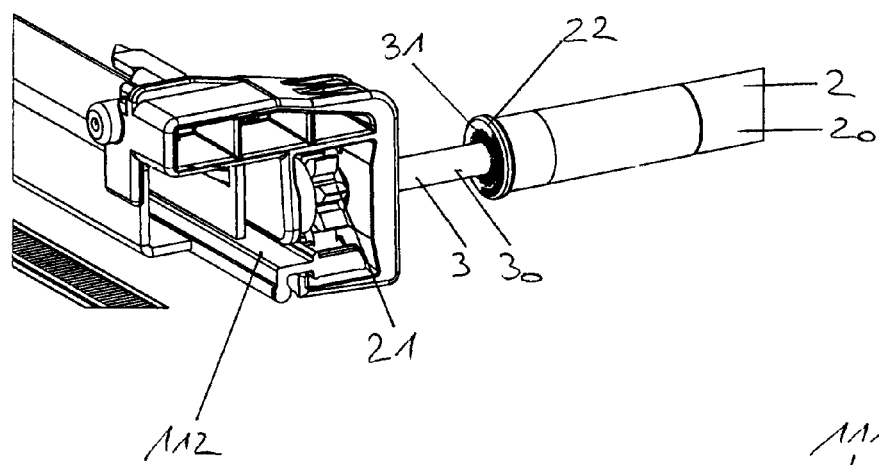
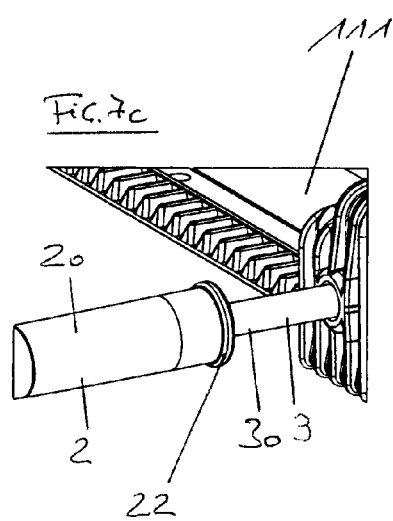

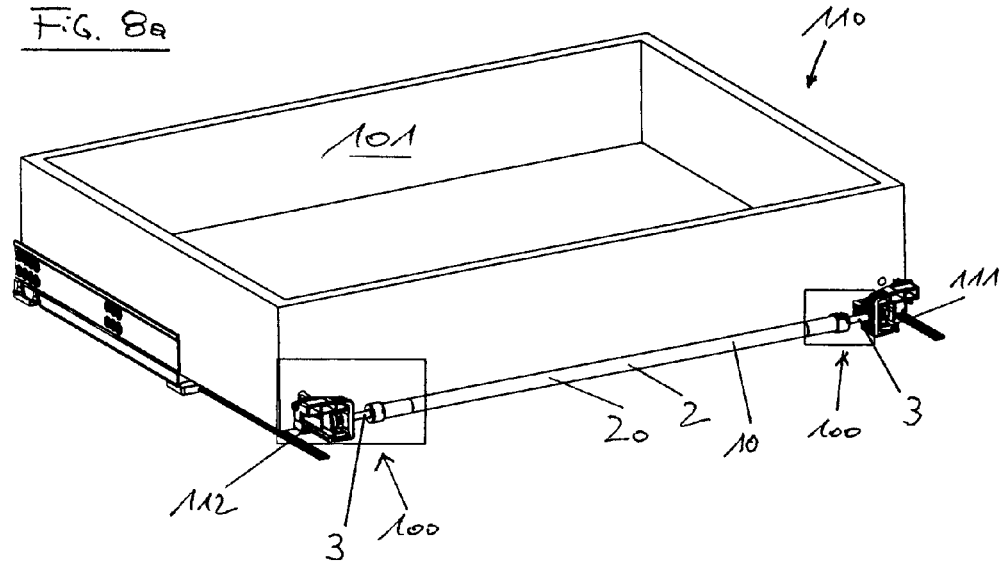
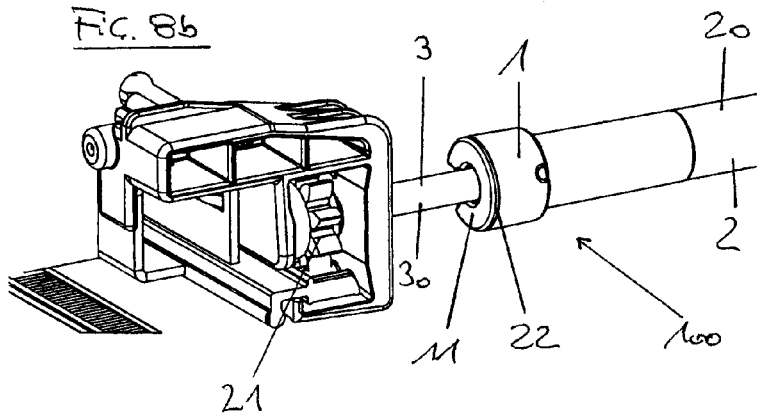
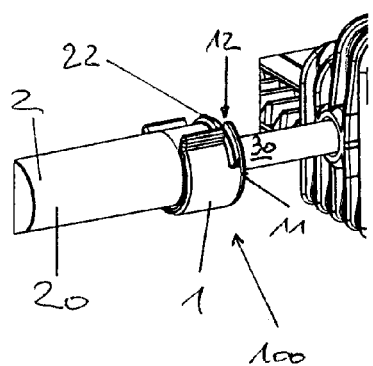

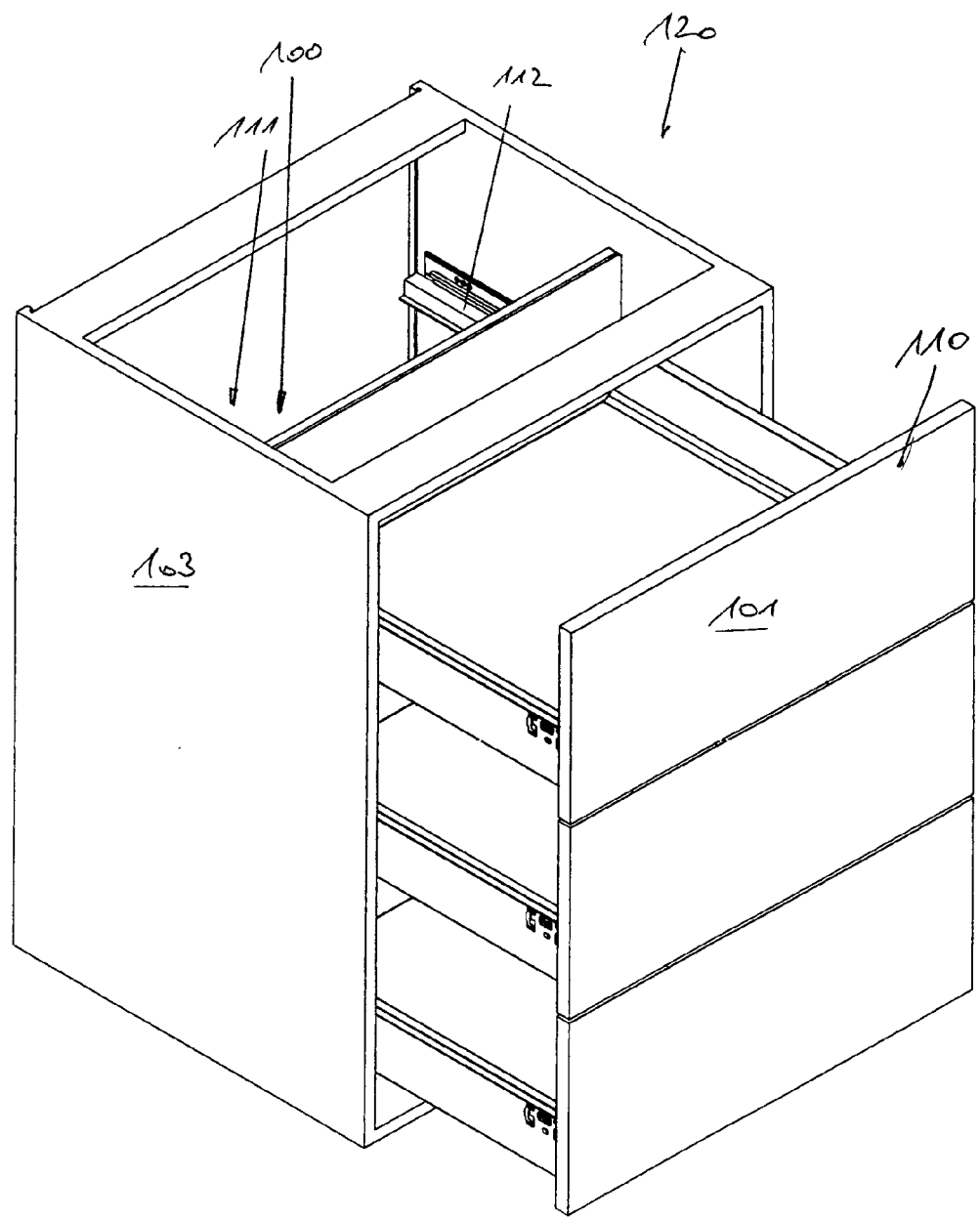

FURNITURE PART COMPRISING A TORQUE-TRANSMITTING SHAFT

BACKGROUND OF THE INVENTION

The invention concerns a movably mounted furniture part comprising a torque-transmitting shaft, in particular a synchronization rod, and the shaft has at least two shaft portions. One shaft portion is in the form of a rod-shaped component, and the second shaft portion is in the form of a connecting portion. A connecting device connects the rod-shaped component to the connecting portion—in particular with at least one spring which resiliently holds the rod-shaped component together with the connecting portion.

The invention further concerns an article of furniture comprising at least one movable furniture part.

There are a large number of such furniture parts belonging to the state of the art. They are used, for example, in relation to drawers which, by way of the side wall, have a connecting device for a railing to stabilize the content loaded in the interior of the drawer.

A further area of use of such furniture parts is, for example, in the case of displaceable drawers. For example, AT 410 162 B dated Mar. 17, 1999 in the name of Julius Blum GmbH discloses a connecting device for furniture parts. In that device for stabilizing the operating movements of a drawer displaceable on a furniture carcass, the rod-shaped component is in the form of a synchronization rod synchronizing a left-hand and a right-hand extension rail in their retraction and extension movement relative to each other. In that case, a torque is transmitted from one side to the other by way of the synchronization rod.

A further use for such furniture parts is also known in relation to flaps of articles of furniture. For example, EP 1 875 026 B1 of Apr. 14, 2006 discloses an article of furniture having side walls, at each of which is arranged a respective control device for movement of the flap, and the control devices are connected by a synchronization rod (rod-shaped component) for synchronous movement of the control devices. The synchronization rod has at at least one end region a fixing device (this corresponds to the connecting device) for releasably connecting the synchronization rod to a rotatable part of the control device.

SUMMARY OF THE INVENTION

The object of the invention is to provide a movably mounted furniture part which is improved over the state of the art, having a torque-transmitting shaft and a connecting device for connecting the rod-shaped component to the connecting portion.

By the use of an arresting portion, it is possible to prevent the connecting portion from becoming autonomously released from the rod-shaped component, which often happens upon transport of the members which are already assembled in manufacture.

Without the arresting portion, unwanted disengagement of the rod-shaped component can occur, as it can sag downwardly due to its own weight and mass inertia and can thus become detached from the connecting portion. The arresting portion can prevent that unintended disengagement of the rod-shaped component during transportation and also otherwise, it therefore operates inter alia as a transport securing means.

After the article of furniture has been fitted at its fitment location, the arresting portion can remain at its assembly position as it does not hinder the function of the rod-shaped component together with the connecting portion.

It will be appreciated that it is equally possible to envisage that an arresting portion which can be fitted is removed again in order to use it a plurality of times, as, after the article of furniture has been set up, the function of the arresting portion is possibly no longer required.

It has proven to be particularly advantageous if the connecting portion is in the form of a pin penetrating into a receiving member of the rod-shaped component. Such a configuration makes it possible to achieve a positively locking connection, and this can contribute to a stable structure.

In a preferred embodiment, the connecting portion is in the form of a receiving member into which the rod-shaped component penetrates. That can also contribute to a stable structure.

In addition, the rod-shaped component can be a synchronization rod for a drawer, wherein the synchronization rod at left and right drives a gear or a roller which synchronizes an extension movement of a left and right extension rail. Thus, a torque can be transmitted from one side of the extension rail to the other side, and this can contribute to a uniform extension and retraction movement of a drawer.

It has proven to be particularly advantageous if the rod-shaped component is a synchronization rod for a furniture flap, which synchronizes a pivotal movement of a left and a right control arm for driving the furniture flap. That configuration therefore makes it possible to avoid twisting of the furniture flap.

Particularly preferably, the arresting portion can be in one piece. The use of a one-piece arresting portion means that assembly can be effected very quickly, which keeps down the costs of working time.

It has proven to be particularly advantageous in that respect if the arresting portion is made of plastic. A plastic arresting portion can be produced well and advantageously, for example, with an injection molding process.

In a preferred embodiment, the arresting portion can be fitted and/or removed without a tool. Fitment and removal without a tool also contributes to being able to keep down the assembly times. In addition, as a result, the arresting portion can be used not only in relation to an individual article of furniture but can also be re-used a number of times.

It has further proven to be advantageous if the arresting portion is a clip. A clip-like configuration means that the arresting portion can be quickly and easily snapped on, which can also keep down the fitment time.

It has proven to be advantageous if the arresting portion is adapted to be pushed radially in circlip-like fashion on to the connecting portion and/or the rod-shaped component. Pushing the arresting portion into place in a radial circlip-like fashion can provide for quick fitment and can also make a stable connection.

In a possible embodiment, the connecting portion and the rod-shaped component have a contour differing from a circular shape in cross-section for the transmission of a torque. The transmission of a torque means that it is possible for synchronization to be effected from the left-hand side of the rod-shaped component to the right-hand side thereof.

It has proven to be particularly advantageous if the arresting portion is provided on the rod-shaped component and/or on the connecting portion.

In a preferred embodiment, the arresting portion can be provided in one piece with the rod-shaped component or in one piece with the connecting portion.

The arresting portion can be provided resiliently on the rod-shaped component or on the connecting portion.

It has proven to be particularly advantageous if the arresting portion has a radially resilient latching portion—preferably a radially resilient latching nose—which projects into the receiving member of the rod-shaped component or the connecting portion.

Particularly preferably, the radially resilient latching portion—preferably the radially resilient latching nose is actuable without a tool.

Particularly preferably, after mounting has been effected to the connecting portion and/or to the rod-shaped component, the arresting portion is displaceable in the axial longitudinal direction relative to the connecting portion and/or the rod-shaped component or the arresting portion provided on the connecting portion or the rod-shaped component is displaceable in the axial longitudinal direction relative to the connecting portion and/or the rod-shaped component. It is thus possible that the rod-shaped component can be displaced relative to the connecting portion even after fitment of the arresting portion or the arresting means has been effected.

A movable furniture part has at least one connecting device as described above, by which the arresting portion secures the rod-shaped component and the connecting portion against release.

In that respect, for a movable furniture part, the connecting device can have a rod-shaped component and two connecting portions, wherein the substantially rod-shaped component can be secured against release between the two connecting portions by two arresting portions.

As a particularly preferred feature, if the movable furniture part is in the form of a drawer or furniture flap.

In specific terms, an article of furniture has at least one movable furniture part as set forth in at least one of the described embodiments.

BRIEF DESCRIPTION OF THE DRAWINGS

Further details and advantages of the present invention are set forth more fully hereinafter by means of the specific description with reference to the embodiments by way of example illustrated in the drawings, in which:

FIGS. 3b and 3c show detail views of FIG. 3a, FIG. 4a shows a rear view as in FIG. 3a with two connections made between the synchronization rod and the connecting portions as a sectional view, FIGS. 4b and 4c show detail views of FIG. 4a, FIG. 5a shows a sectional rear view as in FIGS. 3a and 4a with two fitted arresting portions, FIG. 6a shows a perspective rear view of two extension rails with a synchronization rod and two connecting devices, wherein one side of the synchronization rod is connected to the connecting portion and the second side is not yet connected, FIGS. 6b and 6c shows detail views of FIG. 6a, FIG. 7a shows a rear view as illustrated in FIG. 6a with a connection made at both sides between the synchronization rod and the connecting portions, FIGS. 7b and 7c show detail views of FIG. 7a, FIG. 8a shows a rear view of a drawer with two extension rails with a synchronization device for the two extension rails with fitted arresting portions in the connecting devices, FIGS. 8b and 8c show detail views of FIG. 8a, FIG. 9a shows an article of furniture with a furniture carcass, drawers and extension rails and a synchronization device with two connecting devices.

DETAILED DESCRIPTION OF THE INVENTION

Figure 1A:
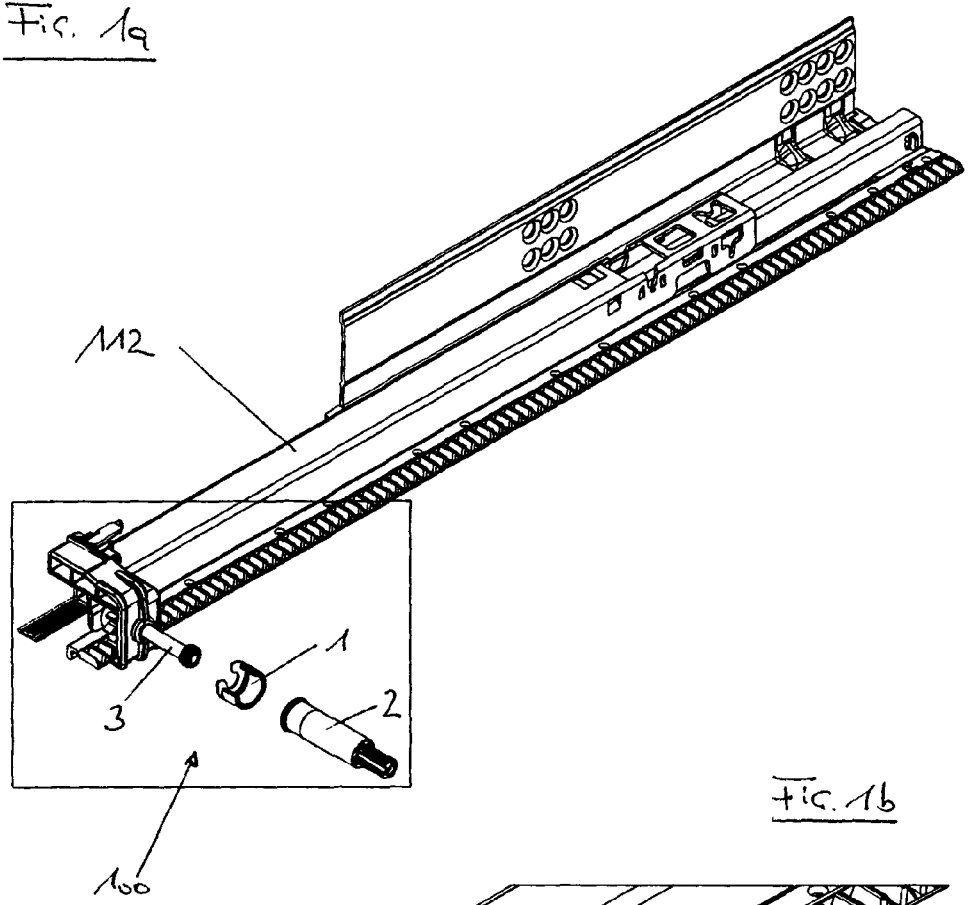
FIG. 1a shows a perspective exploded rear view of a right-hand extension guide with connecting device arranged thereon.

FIG. 1 shows a perspective rear view of a drawer extension guide. The drawer extension guide has a right-hand extension rail 112. To synchronize that right-hand extension rail 112 with a left-hand extension rail 111 (see FIG. 3a), the right-hand extension rail 112 in its rear region has a synchronization device to be moved synchronously out and in with the left-hand extension rail 111. The synchronization device is connected in this case to the extension rails 111 and 112 the connecting device 100.

This connection which in this preferred embodiment can be produced without a tool primarily involves a connecting portion 3 and a rod-shaped component 2 which are connected together by way of the arresting portion 1 and secured to prevent release from each other.

Figure 1B:
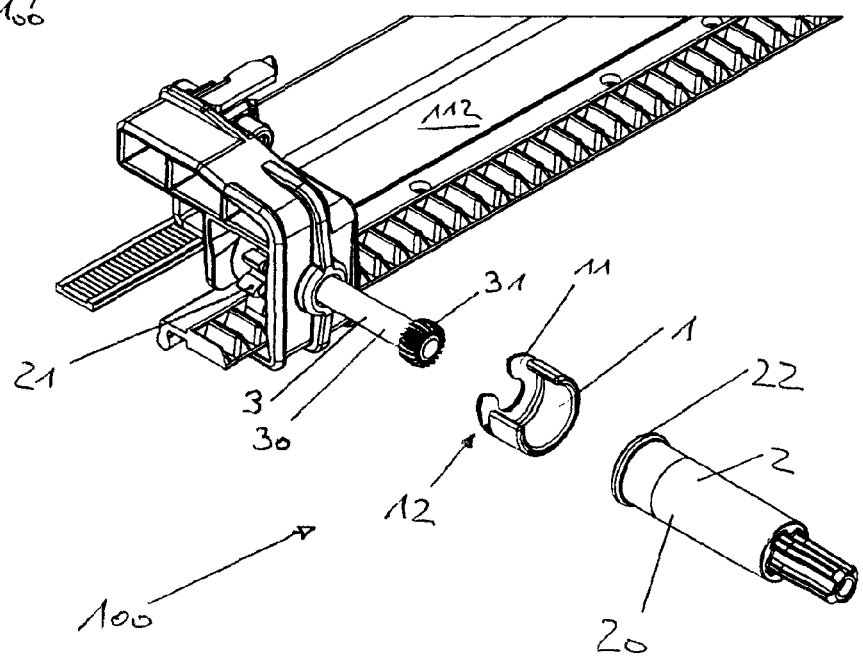
FIG. 1b shows a detail view of FIG. 1a, FIG. 2a shows a perspective rear view of the FIG. 1a connecting device in the assembled condition.

FIG. 1b shows a detail view of FIG. 1a with the connecting device 100 as an exploded view. The portions 2 and 3 to be connected, in this preferred embodiment in the form of a pin 30 and a synchronization rod 20, are held together by the arresting portion 1 after they have been fitted one into the other. To be able to transport a torque, the pin 30 has a thickened portion at its end which is in the form of a gear 31. In the assembled condition with the synchronization rod 20, gear 31 engages into a female thread 23 (see FIG. 6b) in the receiving member 42 of the synchronization rod 20. So that the pin 30 can no longer be released from the synchronization rod 20, the arresting portion 1 in this preferred embodiment is both in one piece and also made of plastic. In this preferred embodiment, the arresting portion 1 has a clip-like configuration and is pushed radially in circlip-like fashion on to the connecting portion 3—that is to say the pin 30—and also clip-like on to the synchronization rod 20.

After the arresting portion 1 has been fitted to the pin 30 and the synchronization rod 20, the synchronization rod 20 can no longer move relative to the arresting portion 1 as the flange 22 of the synchronization rod 20 is latchingly engaged into an opening 12 in the arresting portion 1.

On the other hand, the pin 30 can very well still move relative to the arresting portion 1 and thus relative to the synchronization rod 20 as the circlip-like configuration 11 of the arresting portion 1 admittedly embraces the pin 30, but can also still be displaced on the pin 30. That is, inter alia, because the circlip-like configuration 11 of the arresting portion 1 only engages behind the thickened portion (gear) 31 of the pin 30 and thus can admittedly no longer be pulled axially over the thickened portion 31, but can very well be moved axially away therefrom.

Figure 2A:
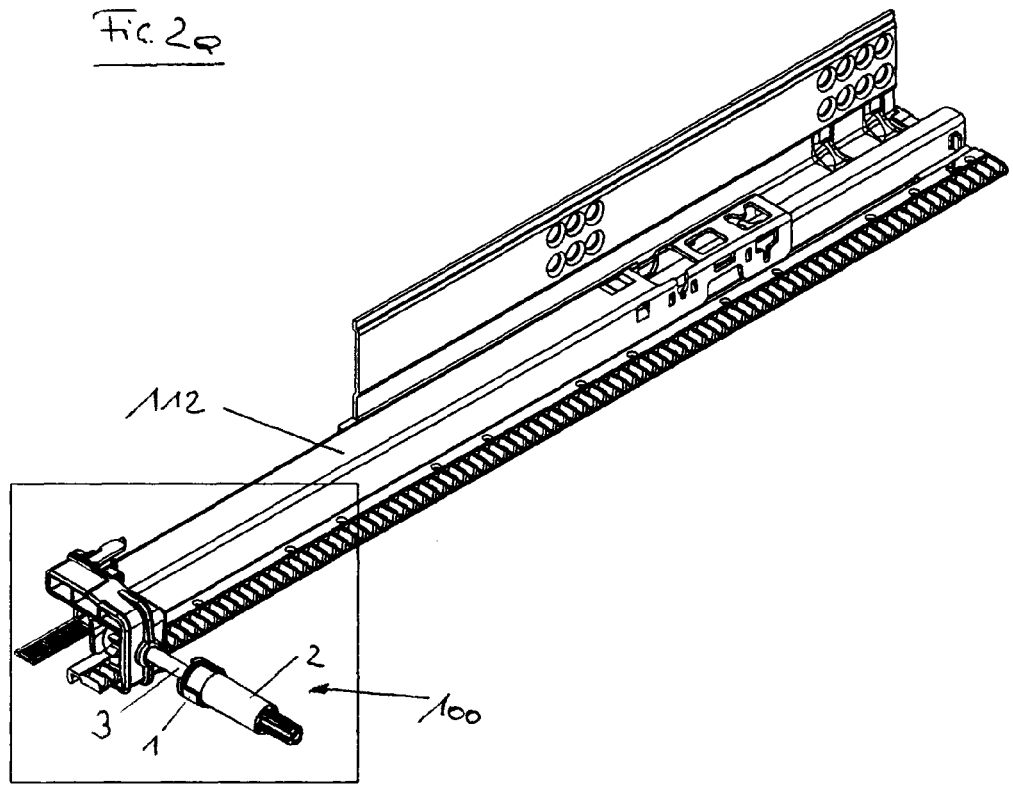
FIG. 2b shows a detail view of FIG. 2a, FIG. 3a shows a rear view of two extension rails with a synchronization rod and two connecting devices, wherein one side of the synchronization rod is connected to the connecting portion and the second side is not yet connected, as a sectional view.

FIG. 2a shows the connecting device 100 as shown in FIG. 1b in the assembled condition.

Figure 2B:
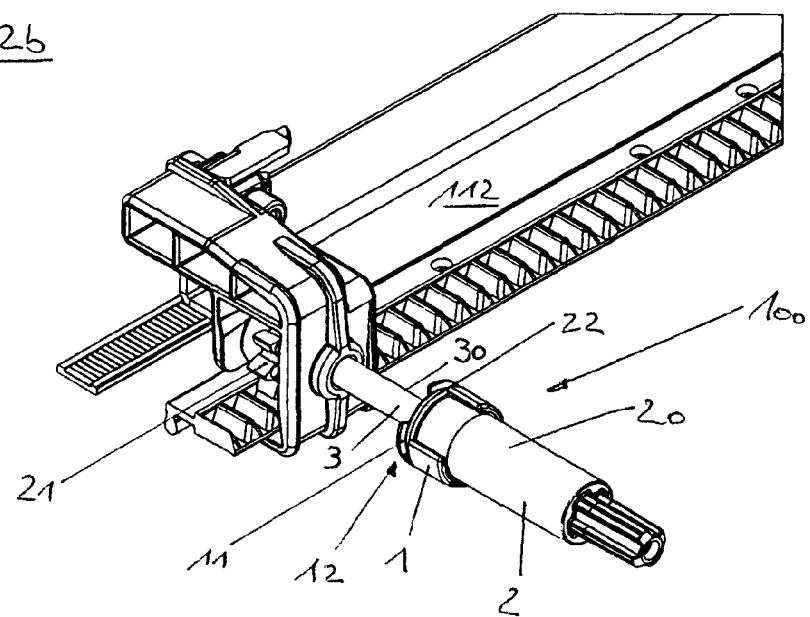

It can be clearly be seen from FIG. 2b that the pin 30 rests in the rod-shaped component 2, which in this preferred embodiment is in the form of the synchronization rod 20. So that those two portions 20 and 30 can no longer separate from each other, the arresting portion 1 is fitted by clipping on over the pin 30 and the synchronization rod 20. In that case, the flange 22 on the synchronization rod 20 rests in the opening 12 in the arresting portion 1. The circlip-like configuration 11 of the arresting portion 1 embraces the connecting portion 3 which has a pin-like configuration at 30.

This therefore ensures that—especially in a transport situation—the rod-shaped component 2 cannot be released from the connecting portion 3.

The preferred assembly process is described with reference to FIGS. 3 through 5 and FIGS. 6 through 8 respectively.

FIG. 3a shows a rear view of a synchronization device for two extension rails 111 and 112. In this case, the synchronization device has the torque-transmitting shaft 10, wherein the shaft 10 has at least two shaft portions, one shaft portion being in the form of a rod-shaped component 2 and the second shaft portion being in the form of a connecting portion 3. In this case, the rod-shaped component 2 which is in the form of the synchronization rod 20 is connected to the left-hand 111 and right-hand extension rail 112 by way of two connecting devices 100.

In the first step (FIG. 3c), the synchronization rod 20 is pushed over the connecting portion 3 which in this preferred embodiment is in the form of the pin 30. The bottom of the blind hole in the synchronization rod 20 has a resilient nature due to the spring 4 in this preferred embodiment. The spring 4 is compressed by the synchronization rod 20. Due to this overlapping relationship of the synchronization rod 20 with the pin 30, this also results on the opposite side (see FIG. 3b) in a spacing between the synchronization rod 20 and the pin 30, whereby the synchronization rod 20 can be inserted on that side. The synchronization rod 20 also has a spring 4 on that side—in this preferred embodiment. That makes it possible for the assembly procedure to be effected in any sequence.

It will be appreciated that it is also conceivable that the synchronization rod 20 has only one spring 4 which, for example, is provided in the center of the synchronization rod 20 and which can be acted upon with force from both sides of the synchronization rod 20.

In this preferred embodiment, the connecting portion 3, as already mentioned above, is in the form of a pin 30, but it will be appreciated that it is equally conceivable that the connecting portion 3 is in the form of a receiving member, in which the rod-shaped component 2—in this preferred embodiment in the form of the synchronization rod 20—penetrates.

FIG. 4a shows the situation of the torque-transmitting shaft 10 with its already fitted synchronization rod 20 at both connecting devices 100 of the left-hand and right-hand extension rails 111 and 112 of a movably mounted furniture part 110, in this embodiment a drawer 101.

It can be clearly seen from the detail views in FIGS. 4b and 4c that the springs 4 are relieved of stress and thus the synchronization rod 20 rests on the two pins 30.

Specifically, in this situation, the case can now arise, where the synchronization rod 20 comes loose from the pin 30. That unwanted circumstance arises specifically when, for example—as occurs relatively frequently upon transport—the article of furniture 120 (see FIGS. 9a through 9c) or the furniture part 110 (see FIGS. 9a through 9c) tilts through 90° and thus the weight of the synchronization rod 20 itself applies a loading to the spring 4 whereby at the other end of the synchronization rod 20 it can become detached from the pin 30 and drops out.

That can be prevented by fitting the arresting portion 1—as shown in FIGS. 5a through 5e.

As can be seen from the detail views 5b, 5c, 5d and 5e, the arresting portion 1 prevents detachment of the rod-shaped component 2 from the connecting portion 3 as that arresting portion 1 was fixed clip-like over the pin 30. The flange 22 of the rod-shaped component 2 which is in the form of the synchronization rod 20 is latchingly engaged in an opening 12 (see also FIG. 1b and FIG. 2) of the arresting portion 1.

Even after fitment of the arresting portion 1 has been effected, the rod-shaped component 2 is displaceable in the axial longitudinal direction relative to the connecting portion 3. That is to say, in this preferred embodiment, the synchronization rod 20, after fitment of the arresting portion 1, is displaceable in the axial longitudinal direction relative to the pin 30.

Figure 5D:
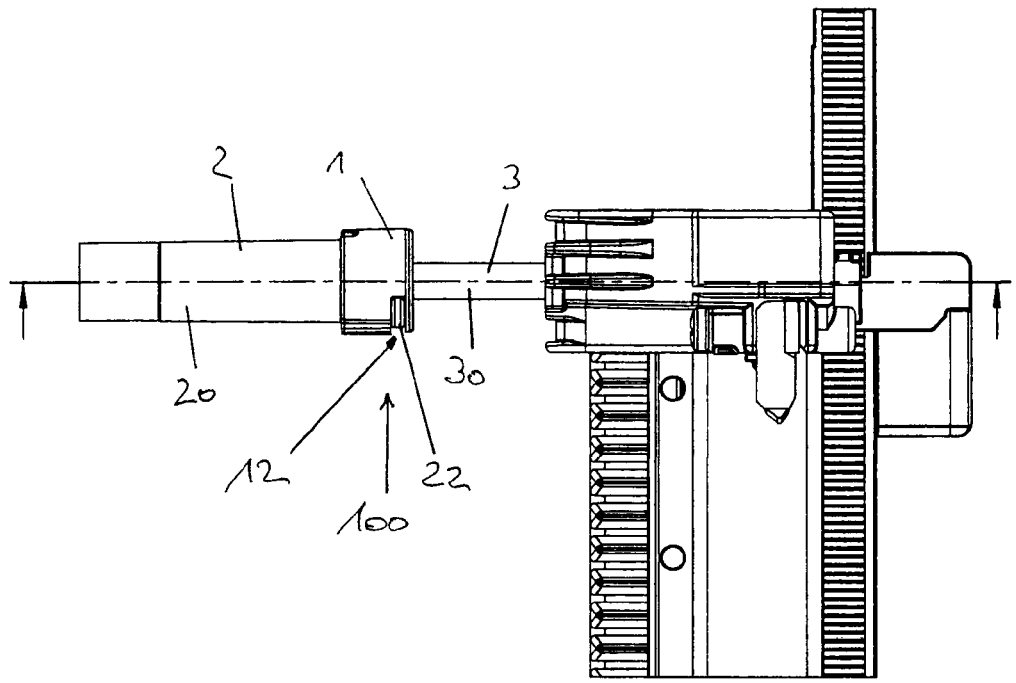
FIGS. 5b and 5c show detail views of FIG. 5a, FIG. 5d shows a plan view of a connecting device without springs with an arresting portion.
FIG. 5e shows a sectional view of FIG. 5d.
Figure 5E:
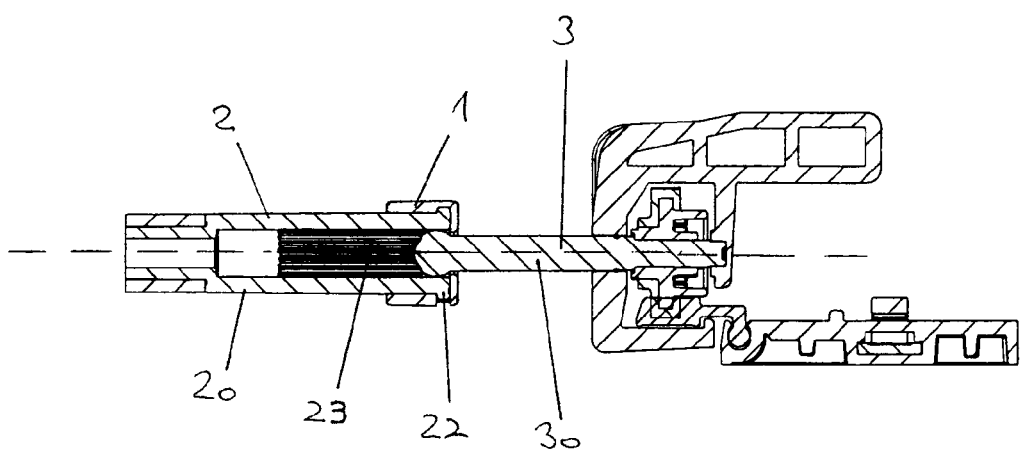

FIGS. 5a through 5c show a preferred embodiment using springs 4. They are, however, not absolutely necessary for functioning of the connecting device 100, as shown by the illustrated variant in FIGS. 5d and 5e which is preferably without springs 4. In the case of already existing systems which were supplied or manufactured without an arresting portion, that arresting portion can also be subsequently retrofitted, which is a further advantage of the invention.

FIGS. 6 through 8 show a perspective view of what has just been described with reference to FIGS. 3 through 5, namely the procedure in assembly of the rod-shaped component 2 on the connecting portion 3, with the aid of an arresting portion 1.

In this respect, FIG. 6 corresponds to FIG. 3, FIG. 7 corresponds to FIG. 4 and FIG. 8 corresponds to FIG. 5. Therefore, everything which has been described with reference to FIGS. 3 through 5 correspondingly also applies to those FIGS. 6 through 8.

It can be clearly seen from FIG. 6b that the pin 30 has the thickened portion 31 in the form of a gear to transmit a torque to the rod-shaped component 2 which is in the form of the synchronization rod 20. For that purpose, the synchronization rod 20 has a female thread 23 in the receiving means 41, corresponding to the gear 31 on the pin 30. It will be appreciated that this does not necessarily involve a gear 31 and a female thread 23 corresponding thereto, and this could naturally also be any other contour which differs in cross-section from a circular shape and with which the connecting portion 3 and the rod-shaped component 2 would have to engage to be able to transmit a torque.

FIG. 8a shows a perspective rear view of the movably mounted furniture part 110—of a drawer 101—mounted on a left-hand extension rail 111 and a right-hand extension rail 112. In this arrangement, the movably mounted furniture part 110 has the torque-transmitting shaft 10. The shaft 10 has at least two shaft portions, one shaft portion being in the form of the rod-shaped component 2 and the second shaft portion being in the form of the connecting portion 3.

In that case, arranged on the drawer 101 is the connecting device 100 for a substantially rod-shaped component 2 with a connecting portion 3, wherein the rod-shaped component 2 in this preferred embodiment has a spring 4 (not shown, see FIGS. 3b and 3c) which resiliently holds the rod-shaped component 2 together with the connecting portion 3. The arrangement includes the arresting portion 1 which can be fitted on the rod-shaped component 2 and on the connecting portion 3, and secures the rod-shaped component 2 and the connecting portion 3 from release from each other. It will be appreciated that it could also be provided that the arresting portion 1 is on the rod-shaped component 2 or on the connecting portion 3 and secures the rod-shaped component 2 and the connecting portion 3 against release from each other (see the corresponding embodiment in FIGS. 10a through 10d and the description thereof).

This embodiment preferably has two arresting portions 1 which are arranged on both sides of the rod-shaped component 2—in the form of the synchronization rod 20—and prevent release of the connecting portion 3 from the rod-shaped component 2.

In this preferred embodiment, that connecting device 100 is used in relation to a drawer. It will be appreciated that it is also conceivable that it is used in relation to a furniture flap to synchronize a pivotal movement of a left-hand and a right-hand control arm for driving the furniture flap. A further possible situation of use is, for example, in relation to a railing of a drawer or the like.

It can be seen from FIG. 8b that the rod-shaped component 2 is in the form of a synchronization rod 20 for the drawer 101, wherein the synchronization rod 20 at right and left drives a gear 21 which synchronizes a retraction and extension movement of a left-hand extension rail 111 and a right-hand extension rail 112.

After assembly has been effected and after transport has also been implemented, the arresting portion 1 can remain on the connecting device 100. However, it will also be appreciated that it is also conceivable that the arresting portion 1 is removed again preferably without a tool and used for further transport purposes for the next drawers or similar articles of furniture.

FIG. 9a shows an article of furniture 120 with a movably mounted furniture part 110—the drawer 101—which is arranged in a furniture carcass 103. The drawer 101 has a left-hand and a right-hand extension rail 111 and 112 which are synchronized with each other by way of a synchronization device. Provided at the synchronization device is the connecting device 100 (not visible, see FIGS. 8a through 8c), which by means of the arresting portions 1 secures the rod-shaped component 2 and the connecting portion 3 against release from each other.

Figure 9B:
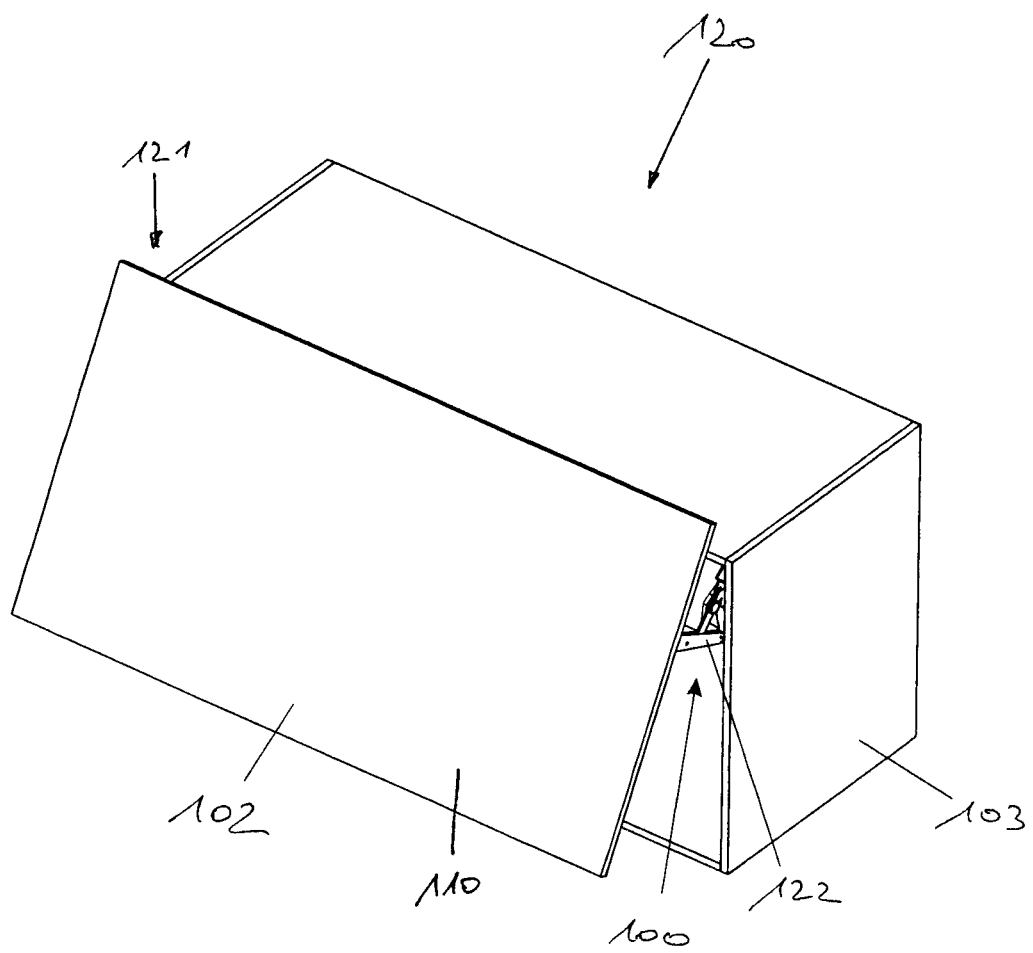
FIG. 9b shows an article of furniture with a furniture carcass and a furniture flap with a synchronization device for the pivotal movement of the left and right control arms with connecting devices.

FIG. 9b shows an article of furniture 120 with a furniture carcass 103 and a movably mounted furniture part 110—a furniture flap 102. A pivotal movement of the left-hand control arm 121 (not visible, concealed by the furniture flap 102) and the right-hand control arm 122 is synchronized by way of a synchronization device. That synchronization device has the connecting device 100 (not visible, concealed by the furniture flap 102) which by way of the arresting portion 1 secures the rod-shaped component 2 and the connecting portion 3 against mutual release.

Figure 9C:
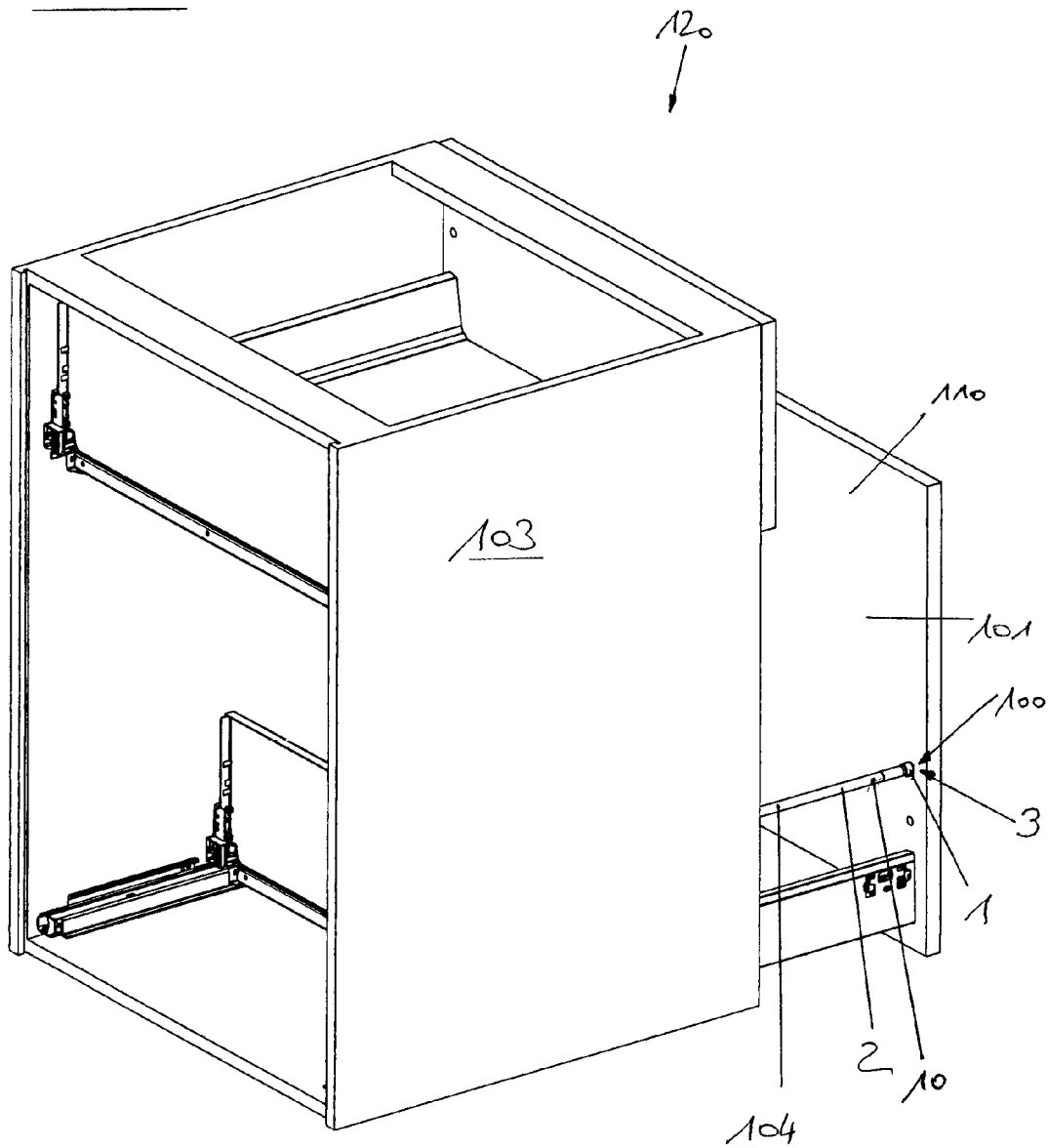
FIG. 9c shows an article of furniture with a furniture carcass and a drawer with railing.

FIG. 9c shows an article of furniture 120 having a furniture carcass 103 and a movably mounted furniture part 110—the drawer 101—wherein the drawer 101 has a railing 104. In this preferred embodiment, the railing 104 is mounted by the connecting device 100 and its arresting portion 1 in the drawer 101 in such a way that it secures the rod-shaped component 2 of the railing 104 against release from the connecting portion 3 (not visible as concealed by the arresting portion 1) of the railing 104. In the case of a railing 104, normally no torque is transmitted by the rod-shaped component 2, but more specifically it is provided that the front panel can be inclined by way of a railing 104 and thus in turn the railing 104 transmits a torque as adjustment of the inclination is effected more especially by rotation of the railing 104, whereby the railing 104 becomes a torque-transmitting shaft 10.

Figure 10B:
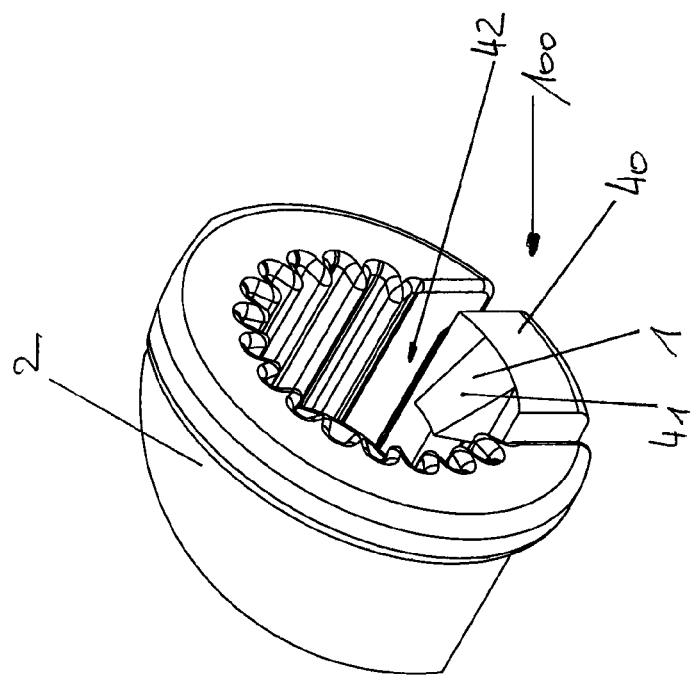
FIG. 10b shows a detail view of FIG. 10a, FIG. 10c shows a perspective view of the further connecting device with a resilient latching portion as the arresting portion.
Figure 10A:
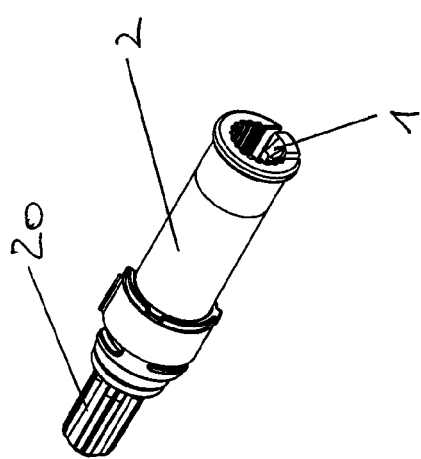
FIG. 10a shows a perspective view of a further connecting device with a resilient latching portion as the arresting portion.

FIG. 10a shows a perspective view of the rod-shaped component 2 which in this embodiment is also in the form of a synchronization rod 20.

In this preferred embodiment, the arresting portion 1 is not in the form of a separate component but is provided directly on the rod-shaped component 2, and preferably the arresting portion 1 and the rod-shaped component 2 have a one-piece configuration together.

As can be clearly seen from FIG. 10b, in this case the arresting portion 1 is provided resiliently on the rod-shaped component 2. In this arrangement, the arresting portion 1 has a radially resilient latching portion 40—which in this preferred embodiment is in the form of a radially resilient latching nose 41. That radially resilient latching nose 41 projects into the receiving member 42 of the rod-shaped component 2, into which the connecting portion 3 (not shown here) penetrates, thus providing a force-locking connection.

By simply pushing on the connecting portion 3, the radially resilient latching nose 41 is urged outwardly and the connecting portion 3 can move into the receiving member 42. As soon as the connecting portion 3 is within the receiving means 42, the radially resilient latching nose 41 snaps upwardly again and by virtue of its projection (that is to say its nose) which projects into the receiving member 42 it prevents the connecting portion 3 from being able to move out of the receiving member 42 of the rod-shaped component 2 again. If renewed release should be wanted, the connecting portion 3 can be released from the rod-shaped component 2 again by urging the latching nose 41 outwardly and at the same time pulling out the connecting portion 3.

A great advantage of that radially resilient latching portion 40 is that it can be actuated without a tool. Thus, it is possible to simply push the connecting portion 3 into the receiving means 42 with subsequent automatic locking.

Even after the connecting portion 3 is disposed in the receiving member 42 of the rod-shaped component 2 and the radially resilient latching nose 41 prevents the connecting portion 3 from coming out, the connecting portion 3 can always still be displaced in the axial longitudinal direction relative to the rod-shaped component 2 as the arresting portion 1 only prevents detachment of the connecting portion 3 from the rod-shaped component 2, but it does not lock that connecting portion 3 to the rod-shaped component 2.

Figure 10D:
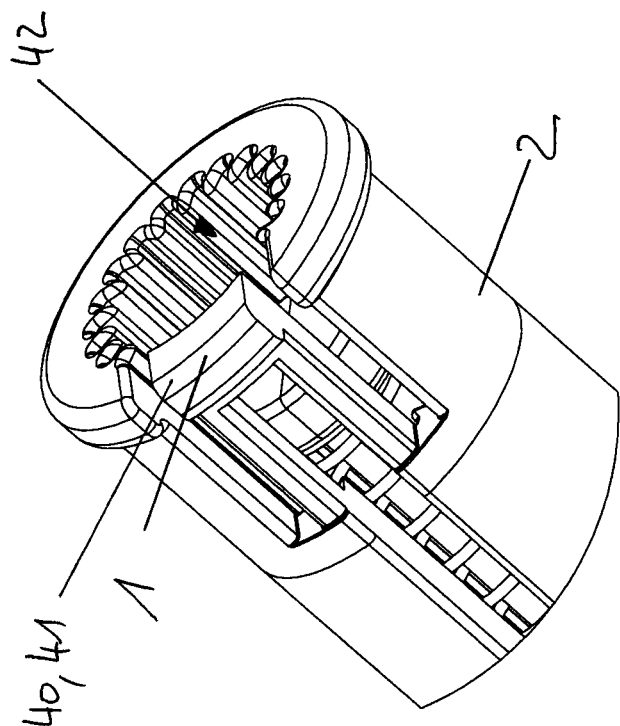
FIG. 10d shows a detail view of FIG. 10c.
Figure 10C:
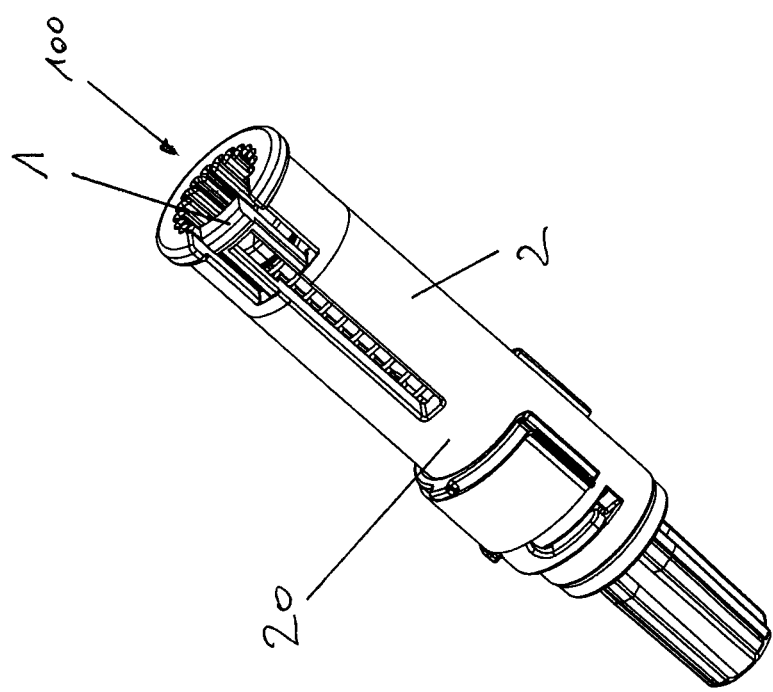

FIG. 10c shows a further perspective view of the rod-shaped component, as just described with reference to FIGS. 10a and 10b.

It can be clearly seen from this view that the arresting portion 1 is in one piece together with the rod-shaped component 2.

Otherwise, the foregoing description relating to FIGS. 10a and 10b applies to FIGS. 10c and 10d.

In this embodiment, the arresting portion 1 is provided on the rod-shaped component 2. It will be self-evident to the man skilled in the art that it would equally be possible for the arresting portion 1 to be provided on the connecting portion 3 and to arrest the rod-shaped component 2 therefrom.

The invention claimed is:

1. A movably mounted furniture part comprising:
   a torque-transmitting shaft including:
      a first shaft portion formed as a rod-shaped component; and
      a second shaft portion formed as a connecting portion;
   a connecting device for connecting said rod-shaped component to said connecting portion with a spring for resiliently holding said rod-shaped component together with said connecting portion to allow relative movement in an axial direction between said rod-shaped component and said connecting portion, said connecting device including an arresting portion on at least one of said rod-shaped component and said connecting portion, said arresting portion being configured to be removably installed on an end of said rod-shaped component and an opposing end of said connecting portion so as to secure said rod-shaped component and said connecting portion against release while allowing the relative movement in the axial direction between said rod-shaped component and said connecting portion, said arresting portion having a cir-clip configuration to be pushed radially onto the end of said rod-shaped component and the opposing end of said connecting portion.

2. The furniture part as set forth in claim 1, wherein said connecting portion is a pin penetrating into a receiving member of said rod-shaped component.

3. The furniture part as set forth in claim 1, wherein said connecting portion is a receiving member into which said rod-shaped component penetrates.

4. The furniture part as set forth in claim 1, wherein said rod-shaped component is a synchronization rod for a drawer, said synchronization rod driving one of a gear or a roller for synchronizing an extension movement of a left extension rail and a right extension rail.

5. The furniture part as set forth in claim 1, wherein said rod-shaped component is a synchronization rod for a furniture flap, said synchronization rod being configured to synchronize a pivotal movement of a left control arm and a right control arm for driving the furniture flap.

6. The furniture part as set forth in claim 1, wherein said arresting portion has a one-piece construction.

7. The furniture part as set forth in claim 1, wherein said arresting portion is plastic.

8. The furniture part as set forth in claim 1, wherein said arresting portion can be fitted and/or removed without a tool.

9. The furniture part as set forth in claim 1, wherein each of said connecting portion and said rod-shaped component have a non-circular cross-section for transmitting torque.

10. The furniture part as set forth in claim 1, wherein said arresting portion is provided resiliently on said rod-shaped component or resiliently on said connecting portion.

11. The furniture part as set forth in claim 1, wherein said arresting portion is displaceable in the axial direction relative to said connecting portion and/or relative to said rod-shaped component after mounting has been effected to said connecting portion and/or to said rod-shaped component.

12. The furniture part as set forth in claim 11, wherein said arresting portion is located on said connecting portion or said rod-shaped component.

13. The furniture part as set forth in claim 1, wherein said connecting portion is a first connecting portion and said arresting portion is a first arresting portion, further comprising a second connecting portion and a second arresting portion, said rod-shaped component being configured to be secured against release between said first connecting portion and said second connecting portion by said first arresting portion and said second arresting portion.

14. The furniture part as set forth in claim 1, wherein the furniture part is one of a drawer or a furniture flap.

15. The furniture part as set forth in claim 1, wherein said torque-transmitting shaft is a synchronization rod.

16. An article of furniture comprising:
   a furniture body; and
   said movable furniture part as set forth in claim 1 movable relative to said furniture body.

* * * * *